June 9, 1931. V. G. APPLE 1,808,751
DYNAMO ELECTRIC MACHINE WITH IMPROVED COOLING SYSTEM
Filed April 7, 1930
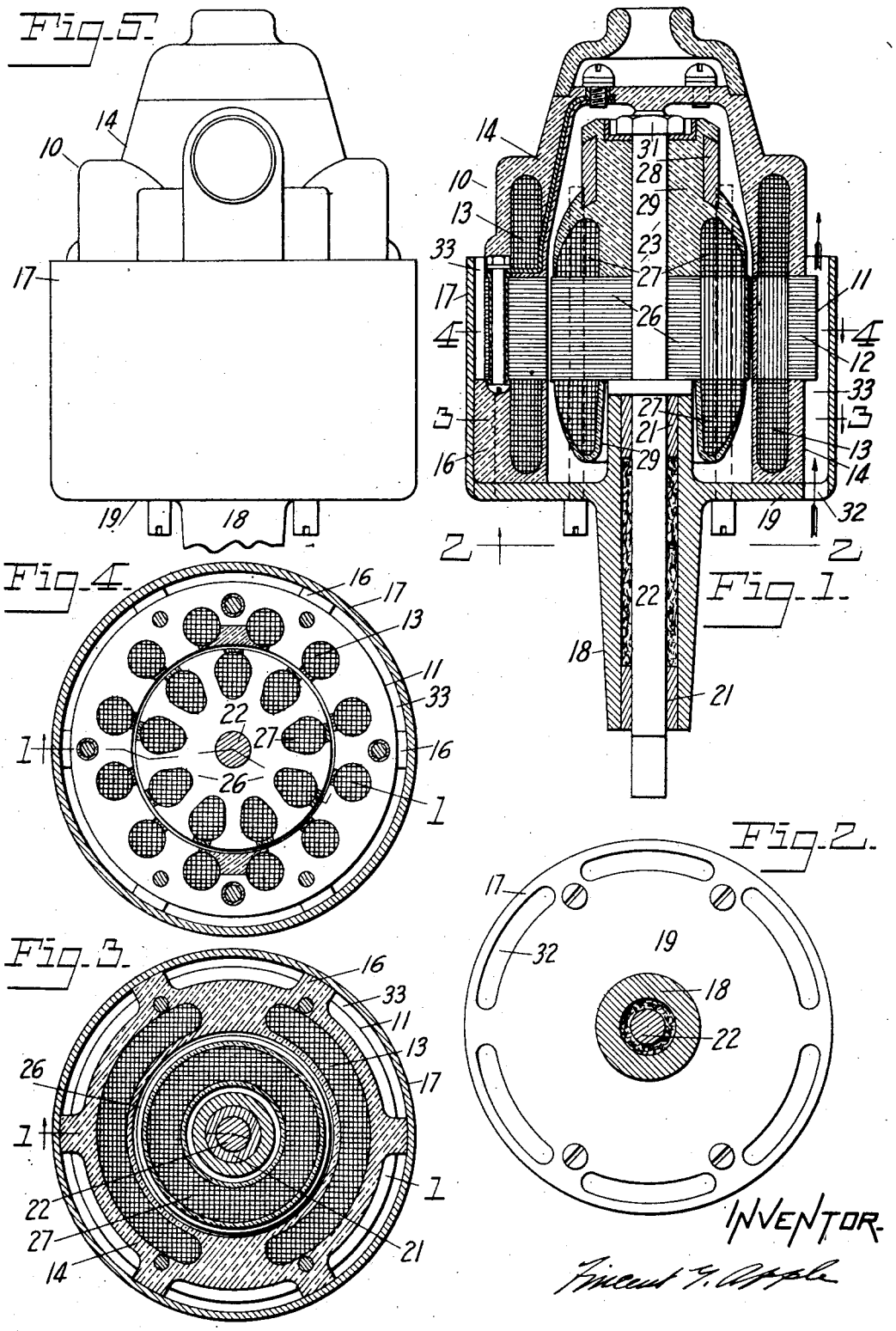
INVENTOR.
Vincent G. Apple Patented June 9, 1931

1,808,751

UNITED STATES PATENT OFFICE

VINCENT G. APPLE, OF DAYTON, OHIO

DYNAMO ELECTRIC MACHINE WITH IMPROVED COOLING SYSTEM

Application filed April 7, 1930. Serial No. 442,394.

This invention relates to dynamo electric machines and particularly to those which are subjected in operation to unusually high temperature.

The object of the invention is to provide a dynamo electric machine wherein the housing may be completely closed, but which has novel means to transfer the heat generated within the machine to the outer surface, thus adapting it to situations where the surrounding air is either too hot or contains dust or other foreign matter which would be detrimental to the interior of the motor, or to situations where a high percentage of overload must be carried.

Another object is to provide means which will cover and guard the outer heated surface of the machine and assist in the dissipation of the heat.

Further objects and meritorious features of the invention will become apparent as the invention is described and reference is had to the drawing wherein,—

Fig. 1 is a vertical axial section, taken at 1—1 of Figs. 3 or 4 through a motor selected as an illustrative embodiment of my invention.

Figs. 2, 3 and 4 are transverse sections taken at 2—2, 3—3 and 4—4 respectively of Fig. 1.

Fig. 5 is an elevation of the motor.

Similar numerals refer to similar parts throughout the several views.

The field element 10 comprises a magnetizable core 11, composed of laminæ 12, field coils 13 and a housing 14 of plastic compound molded about the core and through and about the coils penetrating and filling the interstices thereof and forming an enclosure about the core and coils having space within adapted to contain the armature.

The compound composing the housing is preferably of a cementitious nature and of a kind having a high degree of heat conductivity but a low degree of electrical conductivity, so that the portion separating the several turns of the coils will electrically insulate one turn from another, yet there will be formed a continuous heat conducting path from the innermost turns of the coils through the cementitious material to the core and to the outer surfaces of the molded housing.

In constructing the field element the core 11 is first made by assembling a proper number of laminæ 12. But before the coils 13 are wound about the core the cotton or other fibrous covered magnet wire composing them is preferably given a special treatment. This treatment preferably consists of thoroughly impregnating and coating the wire before it is wound into coils with material of substantially the same nature as that which is afterward to form the housing, but which has been made fluid by the addition of a solvent. The solvent is then preferably expelled before the coils are wound, resulting in a considerable volume of the material being held between adjacent turns of the coils after they are wound in place. Of course the older method of impregnating the coils after they are wound may be pursued if desired.

After the coils and terminals are on the core the structure is first baked to harden the coils then placed in a mold and the plastic compound is pressed about the core, coils and terminals to cover and enclose them and form the housing 14.

By reference to Fig. 3 it may be seen that that portion of the housing which encloses the coils 13 at the open end has a series of longitudinal ribs 16 extending radially outward somewhat beyond the diameter of the core 11, and it is by these ribs that the cup 17 which carries the long bearing hub 18 is concentrically located.

The open end of housing 14 is closed by the bottom 19 of cup 17 and the hub 18 contains two spaced apart bearings 21 within which the armature shaft 22 has rotative bearing. The armature 23 comprising a magnetizable core 26, coils 27 and commutator bars 28, all held together by a mass 29 of substantially the same material as forms the field housing, is held on shaft 22 by nut 31. A series of arcuate slots 32 in bottom 19 correspond to the channels 33 left between the ribs 16 of the housing 14.

In a motor constructed according to my invention the heat generated in the coils during operation is rapidly dissipated because of the continuous heat conducting path through the compound from the innermost recesses of the coils to the surface of the housing, and, because of the cementitious nature of the compound it is carried also from the coils to the metal laminæ of the field core with which the compound is in intimate contact.

After the heat is brought to the surface, the space between the cup 17 and the core 11, the channels 33, and the arcuate slots 32 together form a stack through which the heat rises by natural process. The cup 17 also prevents possible contact of the hand with the core 11 which, of course, is the hottest member.

Having described my invention, I claim,

1. The combination in a dynamo electric machine of a magnetizable core, coils on said core, a mass of cementitious insulation of high heat conductivity penetrating and surrounding said coils cementing them to said core and forming a hollow housing open at one end, and a cup shaped member somewhat larger than said housing having a bottom perforated near its periphery, said bottom being secured to the open end of said housing so as to close said open end, the sides of said cup shaped member surrounding said core at some distance therefrom.

2. The combination in a dynamo electric machine of a magnetizable core, coils on said core, a mass of cementitious insulation of high heat conductivity penetrating and surrounding said coils cementing them to said core and forming a hollow housing open at one end and of slightly larger outside diameter than said core at said open end and having longitudinal channels through said larger portion, and a cup shaped member comprising a cylindrical portion and a bottom perforated to correspond to said channels, said cylindrical portion fitting around said larger portion snugly and said bottom being secured to said open end to close said open end.

3. The combination in a dynamo electric machine of a magnetizable core, coils on said core, a mass of cementitious insulation of high heat conductivity penetrating and surrounding said coils, cementing them to said core and forming a hollow housing sufficiently open at one end to receive an armature and having longitudinal ribs near said open end extending radially from its outer diameter somewhat beyond the core, a cup shaped member comprising a cylindrical portion adapted to fit over said ribs closely, a bottom, perforated to correspond to the channels left between said ribs, secured to the open end of said housing to completely close said open end and an armature shaft bearing concentrically supported in said bottom.

In testimony whereof I affix my signature.

VINCENT G. APPLE.